United States Patent
Cudalbu et al.

(10) Patent No.: US 9,668,087 B2
(45) Date of Patent: May 30, 2017

(54) METHOD AND APPARATUS FOR DETERMINING LOCATION OFFSET INFORMATION

(71) Applicant: Core Wireless Licensing, S.a.r.l., Luxembourg (LU)

(72) Inventors: Ciprian Cudalbu, Berlin (DE); James Joseph Mulholland, London (GB); Mari Joller, Tallinn (EE)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 39 days.

(21) Appl. No.: 14/181,613

(22) Filed: Feb. 14, 2014

(65) Prior Publication Data

US 2014/0162697 A1 Jun. 12, 2014

Related U.S. Application Data

(63) Continuation of application No. 12/916,090, filed on Oct. 29, 2010, now Pat. No. 8,723,888.

(51) Int. Cl.
*H04W 4/02* (2009.01)
*G01C 21/20* (2006.01)

(52) U.S. Cl.
CPC .............. *H04W 4/02* (2013.01); *G01C 21/20* (2013.01)

(58) Field of Classification Search
None
See application file for complete search history.

(56) References Cited

U.S. PATENT DOCUMENTS

| 5,745,387 | A | 4/1998 | Corby, Jr. et al. |
| 6,029,106 | A | 2/2000 | Hale et al. |
| 7,454,090 | B2 | 11/2008 | Wilcock et al. |
| 2001/0015759 | A1 | 8/2001 | Squibbs |
| 2004/0054428 | A1* | 3/2004 | Sheha ............ G01C 21/20 700/56 |
| 2008/0059055 | A1 | 3/2008 | Geelen et al. |

(Continued)

FOREIGN PATENT DOCUMENTS

| JP | H11-250273 A | 9/1999 |
| JP | 2003-132068 A | 5/2003 |

(Continued)

OTHER PUBLICATIONS

Karpischek, Stephan et al., "Swiss Peaks—Mobile augmented reality to identify mountains," http://www.im.ethz ch/publications/swisspeaks.pdf, pp. 1-2.

(Continued)

*Primary Examiner* — Maurice L McDowell, Jr.
(74) *Attorney, Agent, or Firm* — Core Wireless Licensing Ltd.

(57) ABSTRACT

An approach is provided for determining location offset information. A correction manager determines to present, at a device, a location-based display including one or more representations of one or more location-based features. Next, the correction manager receives an input for specifying offset information for at least one of the one or more representations with respect to the location-based display. Then, the correction manager determines to present the one or more representations in the location-based display based, at least in part, on the offset information.

20 Claims, 12 Drawing Sheets

(56) References Cited

U.S. PATENT DOCUMENTS

| | | | |
|---|---|---|---|
| 2008/0268876 A1 | 10/2008 | Gelfand et al. | |
| 2008/0320419 A1 | 12/2008 | Matas et al. | |
| 2009/0100342 A1 | 4/2009 | Jokobson | |
| 2009/0165140 A1 | 6/2009 | Robinson et al. | |
| 2009/0177385 A1 | 7/2009 | Matas et al. | |
| 2009/0197620 A1 | 8/2009 | Choi et al. | |
| 2010/0114469 A1 | 5/2010 | Chao et al. | |
| 2011/0007076 A1* | 1/2011 | Nielsen | G06F 17/30241 345/441 |
| 2011/0098912 A1 | 4/2011 | Baselau et al. | |
| 2011/0137561 A1 | 6/2011 | Kankainen | |
| 2011/0161875 A1 | 6/2011 | Kankainen | |

FOREIGN PATENT DOCUMENTS

| | | |
|---|---|---|
| JP | 2008-209346 A | 9/2008 |
| JP | 2008-542746 A | 11/2008 |
| JP | 2009-36565 A | 2/2009 |
| JP | 2010-230501 A | 10/2010 |
| WO | 2006/132522 A1 | 12/2006 |
| WO | 2009/002942 A2 | 12/2008 |

OTHER PUBLICATIONS

Wikitude AR Travel Guide (Part 2), joos2322, Jan. 7, 2009, http://www.youtube.com/watch?v=tpaJBu4BEuA&feature=related, pp. 1-2.

* cited by examiner

METHOD AND APPARATUS FOR DETERMINING LOCATION OFFSET INFORMATION

CROSS-REFERENCE TO RELATED APPLICATIONS

This application is a continuation of US Publication No. 2012-0105474 (U.S. application Ser. No. 12/916,090 and filed on Oct. 29, 2010) titled METHOD AND APPARATUS FOR DETERMINING LOCATION OFFSET INFORMATION, the entire disclosure of which is incorporated herein by reference.

BACKGROUND

Service providers and device manufacturers (e.g., wireless, cellular, etc.) are continually challenged to deliver value and convenience to consumers by, for example, providing compelling network services. One area of development has been the use of augmented reality to provide users with location and navigational services. For example, modern user devices utilizing augmented reality may superimpose graphics and text over video images depicting the view in front of the user. As such, the user device may be able to tell the user what the user is looking at (e.g., points of interest (POIs), roads, terrain types, boundaries, etc.), for instance, by using a camera to generate the image, a GPS receiver to pinpoint the location of the user device, and a compass to determine the direction in which the user device is pointing. However, such augmented reality systems rely on data (e.g., from the GPS, the compass, etc.) that may not be accurate due to errors as to the location, orientation, etc., of the user device. The resulting incorrect placement of the representations overlaying the real world depicted on the user device display based on the inaccurate data may not be helpful to the user, and, in some circumstance, may even be confusing or frustrating to the user. Accordingly, service providers and device manufacturers face significant technical challenges in providing users with accurate location and navigational information.

Some Example Embodiments

Therefore, there is a need for an approach for effectively and efficiently determining location offset information.

According to one embodiment, a method comprises determining to present, at a device, a location-based display including one or more representations of one or more location-based features. The method also comprises receiving an input for specifying offset information for at least one of the one or more representations with respect to the location-based display. The method further comprises determining to present the one or more representations in the location-based display based, at least in part, on the offset information.

According to another embodiment, an apparatus comprises at least one processor, and at least one memory including computer program code, the at least one memory and the computer program code configured to, with the at least one processor, cause, at least in part, the apparatus to determine to present, at a device, a location-based display including one or more representations of one or more location-based features. The apparatus is also caused to receive an input for specifying offset information for at least one of the one or more representations with respect to the location-based display. The apparatus is further caused to determine to present the one or more representations in the location-based display based, at least in part, on the offset information.

According to another embodiment, a computer-readable storage medium carries one or more sequences of one or more instructions which, when executed by one or more processors, cause, at least in part, an apparatus to determine to present, at a device, a location-based display including one or more representations of one or more location-based features. The apparatus is also caused to receive an input for specifying offset information for at least one of the one or more representations with respect to the location-based display. The apparatus is further caused to determine to present the one or more representations in the location-based display based, at least in part, on the offset information.

According to another embodiment, an apparatus comprises means for determining to present, at a device, a location-based display including one or more representations of one or more location-based features. The apparatus also comprises means for receiving an input for specifying offset information for at least one of the one or more representations with respect to the location-based display. The apparatus further comprises means for determining to present the one or more representations in the location-based display based, at least in part, on the offset information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining location offset information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a location-based display that is an augmented reality display, it is contemplated that the approach described herein may be used with any other location-based displays including, but not limited to, a mixed reality display, a mapping display (e.g., two-dimensional maps, three-dimensional maps, topographical maps, etc.), a navigation display, or a combination thereof.

Figure 1:
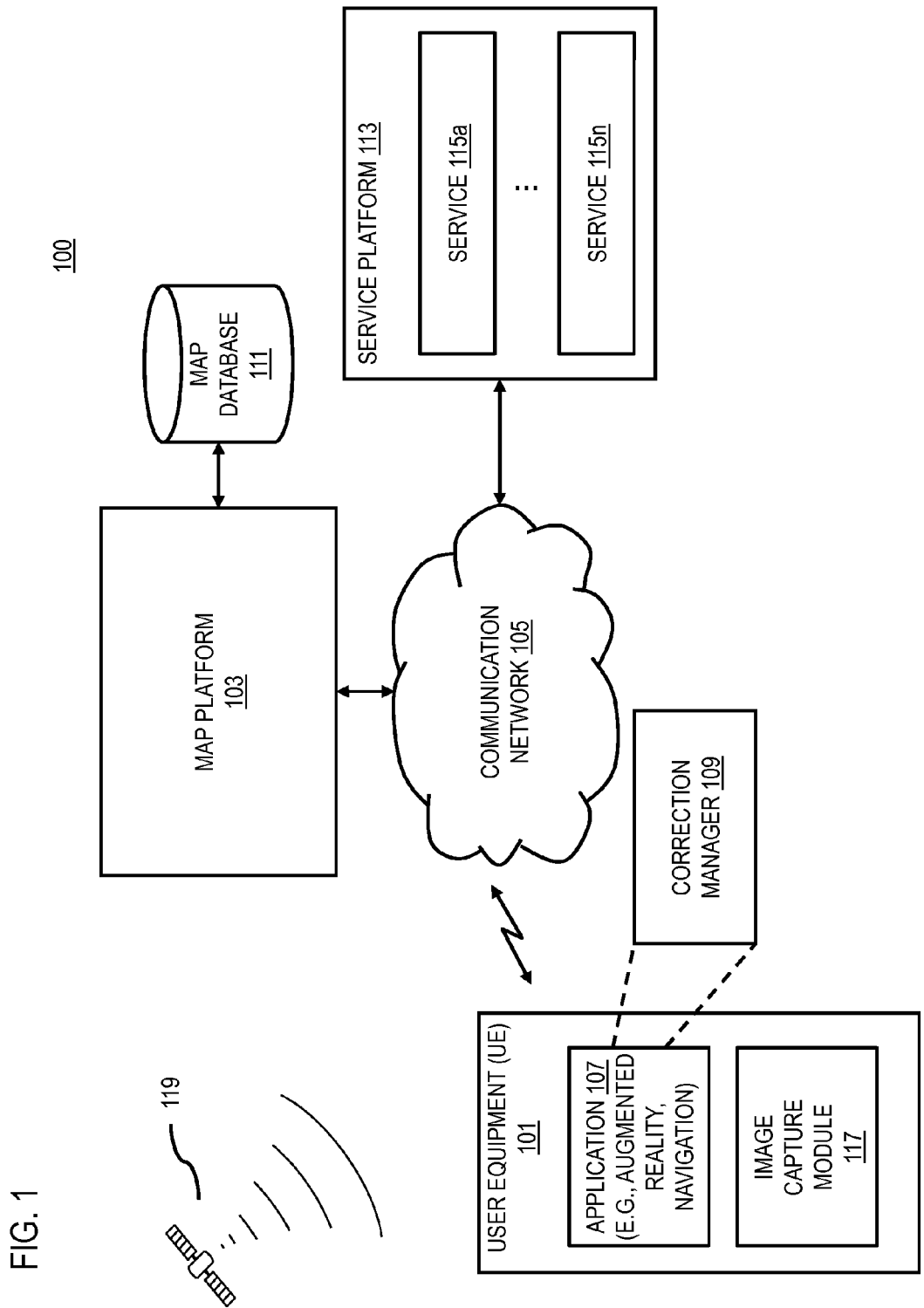
FIG. 1 is a diagram of a system capable of determining location offset information, according to one embodiment.

FIG. 1 is a diagram of a system capable of determining location offset information, according to one embodiment. It is becoming increasingly popular for service providers and device manufacturers to bundle or make available navigation and mapping services on an array of user devices (e.g., mobile handsets, computers, navigation devices, etc.). Such devices may utilize location based technologies (e.g., Global Positioning System (GPS) receivers, cellular triangulation, assisted-GPS (A-GPS), etc.) to provide navigation and mapping information. One growing trend for these services is to move beyond two-dimensional (2D) maps and provide location services based on three-dimensional (3D) maps or representations of locations and/or routes of interest. For example, modern devices may utilize an augmented reality mode to superimpose graphics and text over video images showing buildings in front of the user. The superimposed graphics and text over the video images may, for instance, be icons or labels that represent the buildings shown. The representations (e.g., icons, labels, information, etc.) of the buildings may further overlay the video images based on the building's location to provide the user with information with regard to the buildings. The devices may initially gather preliminary building information, for instance, by using a camera to generate the image, a GPS receiver to pinpoint the location of the user device, and a compass to determine the direction in which the device is pointing. Based on the preliminary information, further information about the buildings may be gather from data on the device, a local database, a service provider, the Internet, and/or any other place from which data may be obtain. The additional information may include data such as the name or type of the building, the address, phone numbers, a description of the building, services that it provides, etc. As mentioned, information provided to users about their surroundings is not limited to buildings, but can apply to any location-based feature, such as their location, other locations, POIs, roads, terrain types, boundaries, etc.

However, such augmented reality systems rely on data (e.g., from the GPS receiver, the compass, etc.) that may not be accurate due to errors as to the location, orientation, etc., of the user device. For example, a GPS receiver on a mobile device may only offer a positional accuracy of about 20 meters, while compasses inside of mobile devices may only provide an orientation accuracy of about 20 degrees. Consequently, these errors may result in the incorrect placement of the graphical or textual representations overlaying the real world depicted, for instance, on the mobile device display. These inaccuracies may cause significant problems for users, especially in circumstances where the location-based features are close together (e.g., two restaurants side-by-side with different ratings, multiple adjacent cities boundaries, etc.).

To address this problem, a system 100 of FIG. 1 introduces the capability of specifying offset information for the representations of location-based features and then presenting the representations on a location-based display based on the offset information. More specifically, the system 100 may receive offset information, for instance, from a user. By way of example, the user may enter offset information into a user device by typing the offset information, by dragging the representations (e.g., using a mouse, touch screen, etc.) to the correct location within the location-based display, or by some other similar fashion. The user may enter the offset information for each representation one by one or the user may choose to apply the offset information provided by the user to a group of representations. The group may include representations manually selected by the user to be included, the representations currently viewable on the location-based display, the representations available in a predetermined area, or all representations available or generated by the system 100. Where the noticeable error is the location information (e.g., geographic coordinates) for a particular location-based feature (e.g., a specific POI), the user may only want to apply the offset information to the representation for the particular location-based feature. Where the noticeable error, however, is with respect to the orientation information that significantly affects the placement of a number of representations, the user may want to apply the offset information to a group of representations (e.g., the representations available within a predetermined area). In addition, the offset information received may also be automatically applied to either one representation or a group of representations.

In certain embodiments, the system 100 may recognize that the user may come back to a particular location, and thus, may store the offset information as well as any other related information for later use. Thus, the offset information may also be received from storage. In addition, the offset information may be transmitted to other devices in the area. This way, the other devices may use the offset information to present other location-based displays. Similarly, the offset information may be received from the other devices.

In other embodiments, the location-based display may be based on location information and/or orientation information. As such, the system 100 may be able to determine accuracy information associated with the location information and/or the orientation information, and then presented the representations based on the accuracy information. In one example, the system 100 may be able to determine that the compass utilized by the user device has an accuracy of +/−20 degrees, and then present the representations based on that determination. In another example, the system 100 may use other location or orientation measurements, such as from a gyroscope, accelerometer, magnetometer, etc., utilized by the user device to determine the accuracy information. In further embodiments, the system 100 may rely exclusively or more significantly on the data from the sensor rather than utilizing the offset information to make adjustments within the location-based display if, for instance, it is determined that the accuracy information meets a predetermined accuracy threshold. For example, an accuracy of +/−20 degrees may be determined not to meet the predetermined accuracy threshold. However, an accuracy of +/−5 degrees may be determined to be sufficiently narrow enough to meet the predetermined accuracy threshold.

More specifically, the system 100 may present, at a device, a location-based display including one or more representations of one or more location-based features. The representations may include icons, labels, information, or anything that may be used to represent location-based features. The location-based features may include a user location, other locations, POIs, roads, terrain types, boundaries, or any other features of a location (or locations). The system 100 may then receive an input for specifying offset information for at least one of the one or more representations with respect to the location-based display. As previously discussed, the input for specifying the offset information may be received from a user, from storage at or accessible from the device, from other devices, etc. As such, the system 100 may further present the one or more representations in the location-based display based on the offset information.

As shown in FIG. 1, the system 100 comprises a user equipment (UE) 101 having connectivity to a map platform 103 via a communication network 105. The mapping information may be utilized by applications 107 on the UE 101 (e.g., an augmented reality application 107, a navigation application 107, etc.). The applications 107 may also include a correction manager 109 to correct the mapping information in the location-based displays generated by the applications 107. It is noted that the correction manager 109 may be include with the UE 101 as shown, or the correction manager 109 may be provided and handled by the map platform 103. Moreover, the mapping information may be included in a map database 111 associated with the map platform 103 for access by the applications 107. In certain embodiments, mapping information is information that may be utilized by the augmented reality application 107 to provide location-based features (e.g., a user location, other locations, POIs, roads, terrain types, boundaries, etc.) and related information to the user. Mapping information may also include maps, satellite images, POI information, street and path information, terrain information, boundary information, signing information associated with maps, objects and structures associated with the maps, information about people and the locations of people, coordinate information associated with the information, etc., or a combination thereof. A POI can be a specific point location that a person may, for instance, find interesting or useful. Examples of points-of-interest can include an airport, a bakery, a dam, a landmark, a restaurant, a hotel, the location of a person, or any point interesting, useful, or significant in some way. Examples of boundaries can include boundaries for real estate, private and public recreation areas, schools, roads, construction, districts, cities, counties/provinces, states, countries, continents, and/or any areas with limits or restrictions.

In certain embodiments, mapping information may be associated with content information including live media (e.g., streaming broadcasts), stored media (e.g., stored on a network or locally), metadata associated with media, text information, location information of other user devices, or a combination thereof. The content may be provided by the service platform 113 which includes one or more services 115a-115n (e.g., music service, mapping service, video service, social networking service, content broadcasting service, etc.), one or more content providers (not shown) (e.g., online content retailers, public databases, etc.), other content source available or accessible over the communication network 105. For example, the applications 107 may display location-related content information (e.g., content associated with a POI or with a particular location) in the location-based display in addition or as an alternate to the POI information and/or other mapping information.

In one embodiment, an image capture module 117 of the UE 101 may be utilized in conjunction with the augmented reality application 107 to present mapping information to the user. For example, the user may be presented with an augmented reality interface associated with the augmented reality application 107 or the navigation application 107 that presents mapping information, content information, and the like on a location-based display. In certain embodiments, the user interface may display a hybrid physical and virtual environment where 3D objects from the map database 111 are placed superimposed on top of a live (e.g., via a camera of the UE 101) or pre-recorded image (e.g., a 360° panoramic picture) of a corresponding location. In another embodiment, the mapping information and the maps presented to the user may be a simulated 3D environment in place of or in addition to the live augmented reality display. Accordingly, the correction manager 109 can operate on the augmented reality location-based display, the simulated 3D display, and/or other location-based displays to correct mapping information presented therein.

As noted, the UE 101 may execute one or more of the applications 107 to view or access mapping information. As mentioned above, the mapping information may include POI information, location information, directions or associations to a location, or a combination thereof. In one example, a default setting may allow the user to view information about POIs associated with locations, structures, and other objects associated with an augmented reality display or 3D environment. In one sample use case, the user may point the UE 101 towards a location-based feature (e.g., a POI) in the location-based display to view corresponding information. More specifically, the application 107 (e.g., the augmented reality application 107) may associate the location-based feature with geographic coordinates (e.g., from satellites 119) based on the determined viewpoint. Then, the application 107 may retrieve information corresponding to the location from the map platform 103 for presentation in the location-based display.

In another sample use case, when the user points the UE 101 towards a location-based feature (e.g., a POI) or towards a general direction, the UE 101 may present one or more representations of one or more location-based features (e.g., POIs) on the location-based display. The placement of the representations on the location-based display may be based on the geographic coordinates of the respective location-based features in addition to the position, the heading reference, and the tilt angle of the UE 101. As previously mentioned, the placement of the representations may be inaccurate due to a number of reasons, such as errors related to location, orientation, etc., of the UE 101. Thus, the correction manager 109 may accept offset information for the representations, for instance, from the user. In this example, the user may supply the offset information by typing the offset information, by dragging the representations (e.g., using a mouse, touch screen, etc.), or by some other similar fashion. As discussed above, the user may enter the offset information for each representation one by one or the user may choose to apply the offset information provided by the user to a group of representations. In addition, the offset information received may also be automatically applied to either one representation or a group of representations.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the correction manager 109 may store the offset information as well as any other related information. The information may be stored at the UE 101 (e.g., cache, memory, hard drive, etc.), a local database, the map database 111, or any other storage device available via the communication network 105. The correction manager 109 may further apply the stored offset information to one or more other location-based displays presented based on location information that is substantially similar to or within a predetermined proximity of location information associated with the location-based display. In one sample use case, a user may be a daily morning guest at a particular café. As such, when the user walks toward the café, the correction manager 109 may recognize that that the current location information is substantially similar to or within a predetermined proximity of the location information of the previous location-based display. Accordingly, the correction manager 109 may apply the stored offset information to the current location-based display, for instance, by automatically calibrating the UE 101 based on the stored offset information. This way, as the user walks toward the café every morning, the user is able to automatically see, for instance, the café's daily specials accurately overlaid on the café in the location-based display of the UE 101.

In another embodiment, the correction manager 109 may transfer the offset information to one or more other devices within proximity of the device, wherein the offset information is used for presenting other location-based displays at the respective other devices. By way of example, a typical café may have dozens of guests who carry mobile devices at any one time during its business hours. When the correction manager 109 receives the offset information, for instance, from a user, it may then transfer the offset information to other UEs 101 within the proximity of the UE 101 of the user. The correction manager 109 of the other UEs 101 may then correct the placement of the representations on the respective location-based displays based on the transferred offset information.

In another embodiment, the correction manager 109 may retrieve other offset information associated with one or more other devices, collected at one or more other time instances, or a combination thereof. The correction manager 109 may then generate aggregated offset information based on the offset information, the other offset information, or a combination thereof. As provided, the correction manager 109 may retrieve and/or store a collection of offset information. By way of example, the offset information and/or the other offset information may be combined and then averaged to generate the aggregated offset information. In addition, the offset information may instead be assigned a default or a user-defined weight, while the other offset information may be assigned various weights automatically or by the user, for instance, based on the relative closeness of the location associated with the other offset information to the location associated with the offset information. Thereafter, the correction manager 109 may generate the aggregated offset information based on the weights given to the offset information and/or the other offset information.

In another embodiment, the correction manager 109 may categorize the offset information, the other offset information, or a combination thereof according to at least a type of device, a type of location sensor, a source of location information, or a combination thereof, wherein the aggregated offset information is further based on the categorization. For example, in addition to relative closeness, the correction manager 109 may recognize that certain device types have more accurate sensor equipment than that of other device types or that the accuracy of particular location sensors are more accurate than that of other location sensors. Based on that information, the various weights may be assigned, automatically or by the user, to the offset information and/or the other offset information. Thereafter, the correction manager 109 may generate the aggregated offset information based on the weights given to the offset information and/or the other offset information.

By way of example, the UE 101, the map platform 103, and the service platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
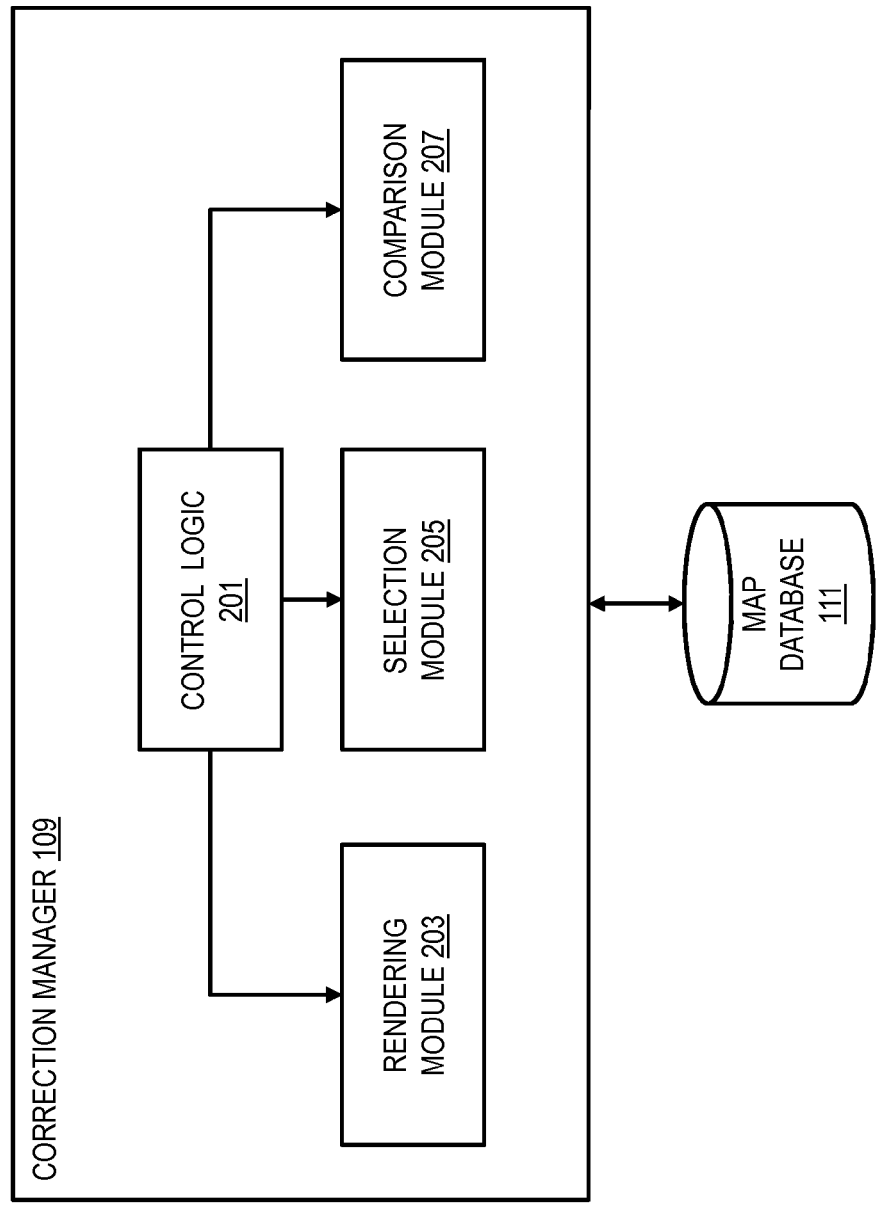
FIG. 2 is a diagram of the components of a correction manager, according to one embodiment.

FIG. 2 is a diagram of the components of a correction manager, according to one embodiment. By way of example, the correction manager 109 includes one or more components for providing location offset information. It is contemplated that the functions of these components may be combined in one or more components or performed by other components of equivalent functionality. In this embodiment, the correction manager 109 includes a control logic 201 which executes at least one algorithm for executing functions of the correction manager 109. For example, the control logic 201 interacts with a rendering module 203 to render or display mapping information (e.g., POI information) on a location-based display of the UE 101. In one embodiment, the rendering module 203 presents an augmented reality display by directing the image capture module 117 of the UE 101 to provide to a user a live camera view of a current location of the UE 101. The image capture module 117 may include a camera, a video camera, and/or other imaging device. In one embodiment, visual media is captured in the form of an image or a series of images. These images are then presented in the location-based display by the rendering module 203.

In addition or alternatively to the augmented reality display, the rendering module 203 may provide a location-based display using non-reality based representations (e.g., a 3D simulated environment or other rendered maps) of a particular location as described above. For example, the rendering module 203 may obtain mapping data (e.g., 3D models, map tiles, map images, terrain features, etc.) from the map database 111 or the map platform 103 to render the location-based display.

After obtaining the underlying location-based display (e.g., either the augmented reality display or the rendered map), the rendering module 203 retrieves mapping information (e.g., POI information) to determine what location-based features are visible in the display. The rendering module 203 then renders representations of the visible location-based features in the location-based display based, at least in part, on their location information and/or orientation information. In other words, the rendering module 203 renders the representations of the location-based features so that the representations of the location-based features are displayed in the location-based display at positions that correspond to their location information and/or orientation information.

Next, the control logic 201 directs the selection module 205 to receive input from the UE 101 for selecting the representations for which the received offset information may apply. By way of example, the group may be manually selected by the user from the location-based display. For example, the user may tap on a set of overlapping or closely located representations to select the entire group. Moreover, the group may include the representations currently viewable on the location-based display, the representations available in a predetermined area, or all representations available or generated by the correction manager 109.

Further, the control logic 201 works with the comparison module 207 to determine whether the offset information should be applied or to the extent that the offset information should be applied. In one sample use case, the comparison module 207 may determine, for instance, that the accuracy information associated with the location information and/or the orientation information meets a predetermined accuracy threshold. Thus, the comparison module 207 may recommend that the application of the offset information be reduced to presenting the representations on the location-based display. In another sample use case, the comparison module 207 may determine whether to apply stored offset information to other location-based displays. For example, the stored offset information may be applied if the comparison module 207 determines that the location information of the other location-based display is substantially similar to or within a predetermined proximity of the location information associated with the location-based display for which the stored offset information was received.

Figure 3:
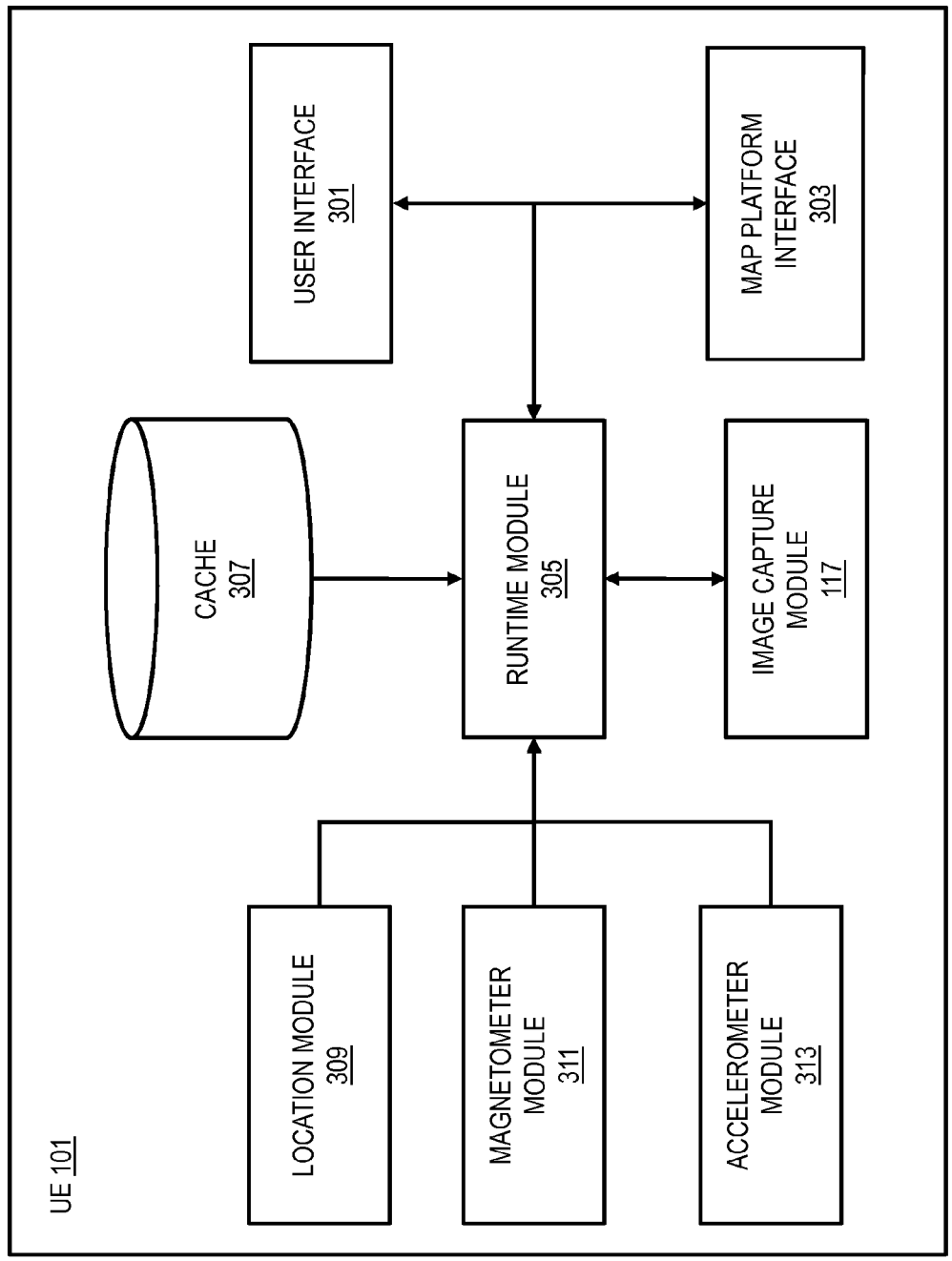
FIG. 3 is a diagram of the components of a user equipment, according to one embodiment.

FIG. 3 is a diagram of the components of a user equipment, according to one embodiment. By way of example, the UE 101 includes one or more components for providing location offset information. It is contemplated that the functions of these components may be combined in one or more components or performed by other components of equivalent functionality. In this embodiment, the UE 101 includes: (1) a user interface 301 to present a location-based display including, for instance, representations of location-based features, and to receive input for specifying offset information for the representations with respect to the location-based display; (2) a map platform interface 303 to retrieve content and mapping information from the map platform 103 and/or the service platform 113; (3) a runtime module 305 for executing one or more applications (e.g., augmented reality application 107, navigation application 107); (4) a cache 307 to locally store mapping information and/or related content information; (5) a location module 309 to determine a location of the UE 101; (6) a magnetometer module 311 to determine horizontal orientation or directional heading (e.g., a compass heading) of the UE 101; and (7) an accelerometer module 313 to determine vertical orientation or an angle of elevation of the UE 101; and (8) an image capture module 117.

The location-based display may be presented to the user via the user interface 301, which may include various methods of communication. For example, the user interface 301 can have outputs including a visual component (e.g., a screen), an audio component (e.g., a verbal instructions), a physical component (e.g., haptic feedback), and other methods of communication. User inputs can include a touchscreen interface, microphone, camera, a scroll-and-click interface, a button interface, etc. Further, the user may input a request to start an application 107 (e.g., an augmented reality or navigation application) and utilize the user interface 301 to receive a location-based display including POI and/or other mapping information. Through the user interface 301, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101.

The map platform interface 303 is used by the runtime module 305 to communicate with the map platform 103. In some embodiments, the interface is used to fetch content, mapping, and or location information from the map platform 103, service platform 113, and/or content providers (not shown). The UE 101 may utilize requests in a client server format to retrieve the mapping and content information. Moreover, the UE 101 may specify location information and/or orientation information in the request to retrieve the mapping and content information. The location module 309, magnetometer module 311, accelerometer module 313, and image capture module 117 may be utilized to determine location and/or orientation information used in determining along which direction the UE 101 is pointed (e.g., the viewpoint of the UE 101) so that mapping and content information corresponding to the pointed direction can be retrieved. Further, this mapping and content information may be stored in the cache 307 to be utilized in correcting a location-based display at the UE 101.

In one embodiment, the location module 309 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 309 may also utilize multiple technologies to detect the location of the UE 101. GPS coordinates can provide finer detail as to the location of the UE 101. As previously noted, the location module 309 may be utilized to determine location coordinates for use by the application 107 and/or the map platform 103.

The magnetometer module 311 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which geographic feature, object, or POI) the UE 101 is pointing towards. This information may be utilized to select a first person view to render mapping and content information in the location-based display.

Further, the accelerometer module 313 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 313 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint to provide content and mapping information to the user. As such, this information may be utilized in selecting available content items to present navigational information to the user. Moreover, the combined information may be utilized to determine portions of a particular 3D map or augmented reality view that may interest the user. In one embodiment, if the location information associated with one or more available content items does not correspond to the viewpoint (e.g., is not visible in the selected viewpoint), one or more indicators (e.g., arrows or pointers) may be showed on the user interface to indicate the direction towards the location of the content items.

In another embodiment, the user may manually input any one or more of the location, directional heading, and tilt angle to specify a viewpoint for displaying the user interface on the UE 101 instead of determining the viewpoint from the sensors. In this way, the user may select a "virtual viewpoint" to be a place other than the current location and pointing direction of the UE 101.

Images for supporting a graphical user interface can be captured using the image capture module 117. The image capture module 117 may include a camera, a video camera, a combination thereof, etc. In one embodiment, visual media is captured in the form of an image or a series of images. The image capture module 117 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve mapping and content information from the map cache 307 or the map platform 103. In certain embodiments, the cache 307 includes all or a portion the information in the map database 111.

Figure 4:
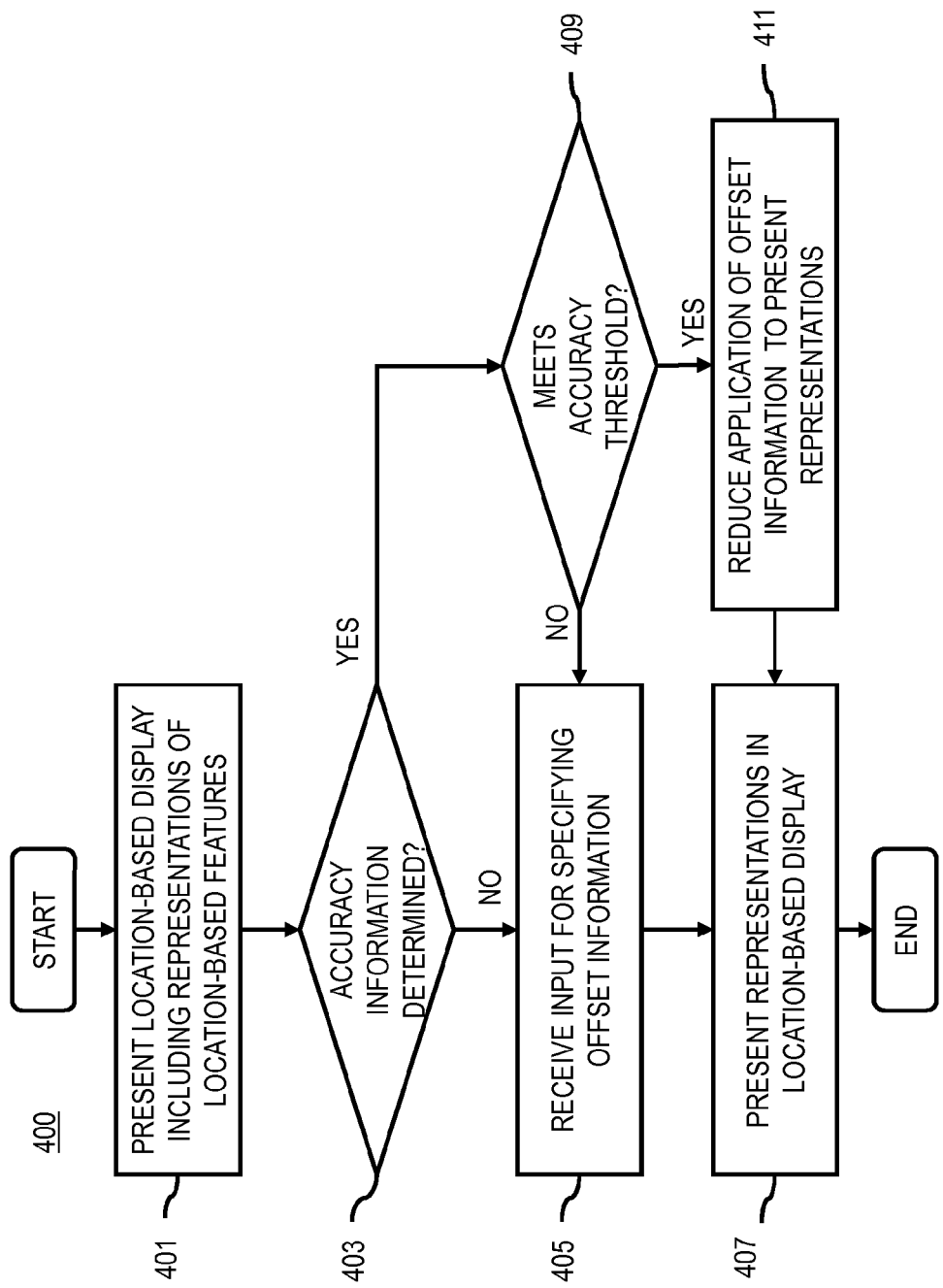
FIG. 4 is a flowchart of a process for determining location offset information, according to one embodiment.
Figure 10:
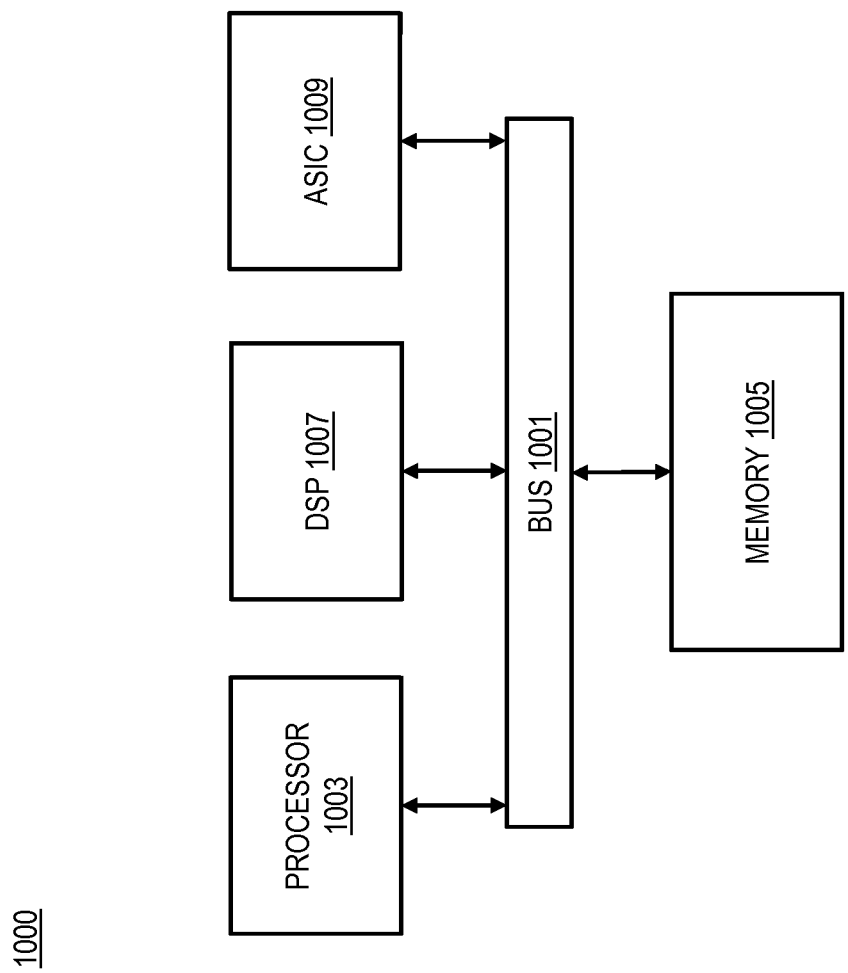
FIG. 10 is a diagram of a chip set that can be used to implement an embodiment of the invention.

FIG. 4 is a flowchart of a process for determining location offset information, according to one embodiment. In one embodiment, the correction manager 109 performs the process 400 and is implemented in, for instance, a chip set including a processor and a memory as shown in FIG. 10. As such, the control logic 201 can provide means for accomplishing various parts of the process 400 as well as means for accomplishing other processes in conjunction with other components of the correction manager 109.

In step 401, the control logic 201 determines to present, at a device, a location-based display including one or more representations of one or more location-based features. The one or more location-based features may include a user location, other locations, POIs, roads, terrain types, boundaries, or any other features of a location (or locations). In one embodiment, the location-based display presented may be based on location information, orientation information, or a combination thereof associated with the device. For example, the location-based display may include the image captured by the device or the visible image on the device's viewfinder.

In step 403, the control logic 201 may verify whether accuracy information associated with the location information, the orientation information, or a combination thereof has been determined. If the accuracy information has not been determined, then the control logic 201 may receive, as in step 405, an input for specifying offset information for at least one of the one or more representations with respect to the location-based display. As previously discussed, the input may be received from various sources including from a user, from storage at or accessible from the device, from other devices, etc. In one embodiment, the input is provided as a movement of the at least one of the one or more representations. The user, for instance, may supply the input specifying the offset information by dragging one of the representations to the correct location within the location-based display. The control logic 201 may then, as in step 407, determine to present the one or more representations in the location-based display based, at least in part, on the offset information.

However, if the control logic 201 is able to confirm that accuracy information has been determined, then the control logic 201 may then, as in step 409, determine whether the accuracy information meets a predetermined accuracy threshold. In one sample use case, the component (or components) utilized by the UE 101 to measure orientation, such as a compass, gyroscope, accelerometer, magnetometer, etc., may initially be determined to have an accuracy of +/−20 degrees. As such, the control logic 201 may determine that the predetermined accuracy threshold has not been met. However, the control logic 201 may determine that the predetermined accuracy threshold has been met if it is later determined that the orientation measurement component has an accuracy of +/−5 degrees. For example, the user may have been in a particular area with a substantial amount of ferrous metals. As the user travels away from that area, the accuracy of the orientation measurement component, for instance, may improve. In another sample use case, the user may be walking through an area without much wireless interference or signal blockage. Under those circumstances, the GPS receiver utilized by the UE 101 may initially be determined to have an accuracy of +/−5 meters, which may meet the predetermined accuracy threshold. Yet, when the user heads into the city or walks under a bridge, the GPS receiver may be determined to have an accuracy of +/−20 meters, which may not be precise enough to meet the predetermined accuracy threshold.

If the control logic 201 determines that the predetermined accuracy threshold has been met, the control logic 201 may, as in step 411, determine to reduce application of the offset information to present the one or more representations. As such, the offset information may not be utilized to adjust the one or more representations within the location-based display.

Figure 5:
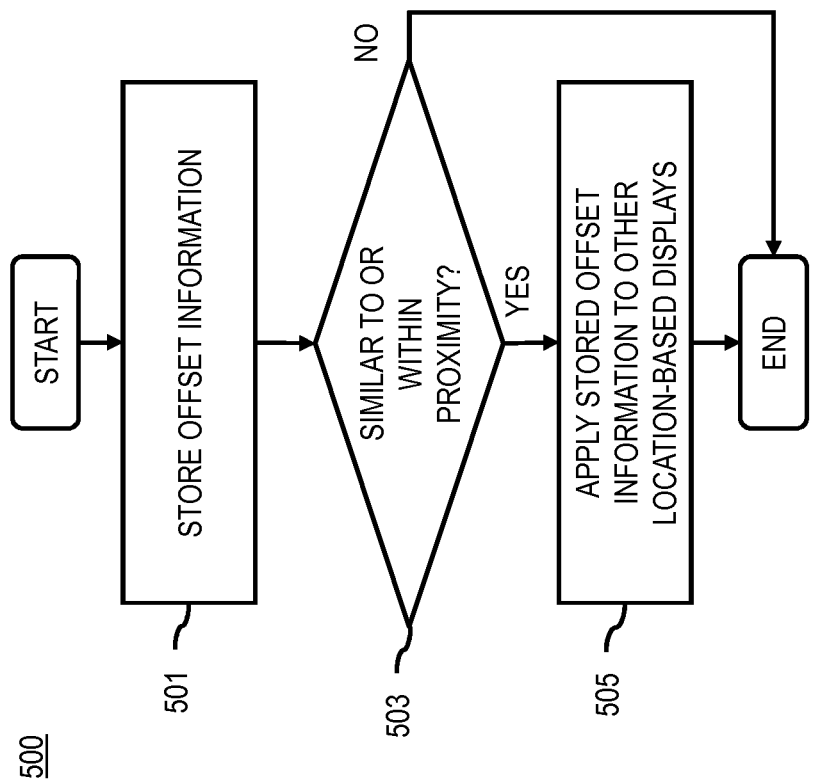
FIG. 5 is a flowchart of a process for utilizing stored location offset information, according to one embodiment.

FIG. 5 is a flowchart of a process for utilizing stored location offset information, according to one embodiment. In one embodiment, the correction manager 109 performs the process 500 and is implemented in, for instance, a chip set including a processor and a memory as shown in FIG. 10. As such, the control logic 201 can provide means for accomplishing various parts of the process 500 as well as means for accomplishing other processes in conjunction with other components of the correction manager 109.

In step 501, the control logic 201 determines to the offset information. As previously mentioned, the information may be stored at the UE 101 (e.g., cache, memory, hard drive, etc.), a local database, the map database 111, or any other storage device available via the communication network 105.

Before determining to apply the stored offset information to one or more other location-based displays, the control logic 201 may, as in step 503, determine whether the location information associated with the one or more other location-based display is substantially similar to or within a predetermined proximity of the location information associated with the location-based display for which the stored offset information was received. If the control logic determines, for instance, that the location information associated with the one or more other location-based displays was not substantially similar to or within a predetermined proximity, then the stored offset information may not be applied to the one or more other location-based displays. In one sample use case, the user may have recently shopped at a grocery store within a particular shopping center. Although the user may return to the shopping center at a later time (e.g., to study at a café at the other end of the shopping center), the control logic 201 may determine that the return to the shopping center is not substantially similar to or within a predetermined proximity of the grocery store. Thus, in this example, the stored offset information may not be applied in presenting the location-based display of the user's return to the shopping center.

However, if the one or more other location-based displays is determined to be substantially similar or within a predetermined proximity, the control logic 201 may, as in step 505, apply the stored offset information in presenting the one or more other location-based displays.

Figure 6:
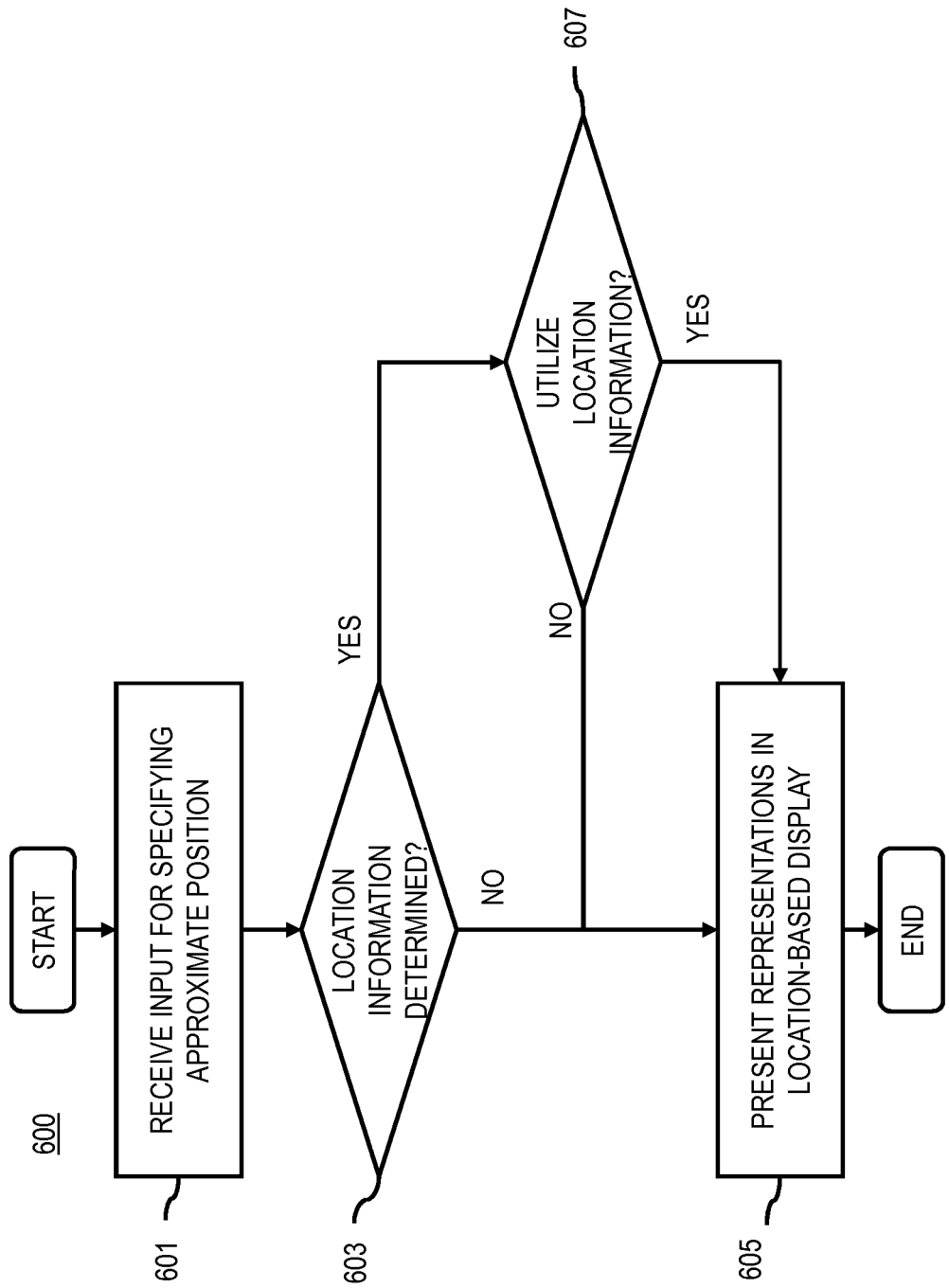
FIG. 6 is a flowchart of a process for determining an approximate position, according to one embodiment.

FIG. 6 is a flowchart of a process for determining an approximate position, according to one embodiment. In one embodiment, the correction manager 109 performs the process 600 and is implemented in, for instance, a chip set including a processor and a memory as shown in FIG. 10. As such, the control logic 201 can provide means for accomplishing various parts of the process 600 as well as means for accomplishing other processes in conjunction with other components of the correction manager 109.

In step 601, the control logic 201 receives an input for specifying an approximate position or location of a UE 101 or a user of the UE 101. In one embodiment, the specified approximate location can be used as the starting point of a navigation service, a mapping service, or other location-based service. For example, if an initial sensor-based location fix (e.g., a GPS fix) is delayed or otherwise not obtainable, the user can nonetheless manually indicate an approximate position to initiate the services. As mentioned, the input may be received from various sources including from a user, from storage at or accessible from the device, from other devices, etc. The received input may be for specifying an approximate position of the user, other users, starting position, etc. In one embodiment, the offset information specified by the input may also specify or otherwise indicate an approximate location of the UE 101 or user. By way of example, the user may provide the input by moving at least one of the representations. As such, the user may drag the representation of the user's position to the appropriate place within the location-based display. Similarly, the user may drag the representation of the location (e.g., dragging only the map layer) such that the user's position ends up at the appropriate place within the location-based display. In addition, the user may provide the input in a number of other ways, including indicating an approximate position (e.g., by clicking or tapping on a particular location) within the location-based display, entering the address of the particular location, capturing an image (e.g., taking a picture using a camera module of the UE 101) of the user's surroundings to indicate the particular location, etc.

In step 603, the control logic 201 may determine whether location information is already available, for instance, from the GPS receiver of the UE 101. If the control logic 201 determines that the location information is not available, the control logic 201 may then, as in step 605, present the representations in the location-based display based on the received input.

However, if the control logic 201 determines that the location information is available, the control logic 201 may then, as in step 607, determine whether to utilize the location information. In one sample use case, the control logic 201 may prompt the user via the UE 101 to decide whether to utilize the received input provided by the user, the location information provided by the GPS receiver, or both in presenting the representation in the location-based display. For example, if the user decides to utilize both the received input and the location information, the control logic 201 may present the received input and the location information as different representations (e.g., a pink point to present the received input and a red point to represent the GPS location information) on the location-based display.

In another sample use case, the determination of whether to utilize the location information may be based whether the location information provided by the GPS receiver satisfies a predetermined accuracy threshold. If the control logic 201 determines that the location information should not be utilized (e.g., the predetermined accuracy threshold has not satisfied), then the presentation of the representations in the location-based display may be based on the received input provided by the user. Otherwise, as mentioned, the location information may be utilized in addition to or in place of the received input provided by the user in presenting the representations in the location-based display.

FIGS. 7A-7D are diagrams of user interfaces utilized in the processes of FIG. 4, according to various embodiments. Specifically, FIGS. 7A-7D are examples of user interfaces utilizing augmented reality displays with star-shaped icons indicating location-based features within the viewpoint (e.g., POIs). Because the user interfaces are augmented reality displays, the image displayed in the mapping is a live image of, for instance, a town square.

Figure 7A:
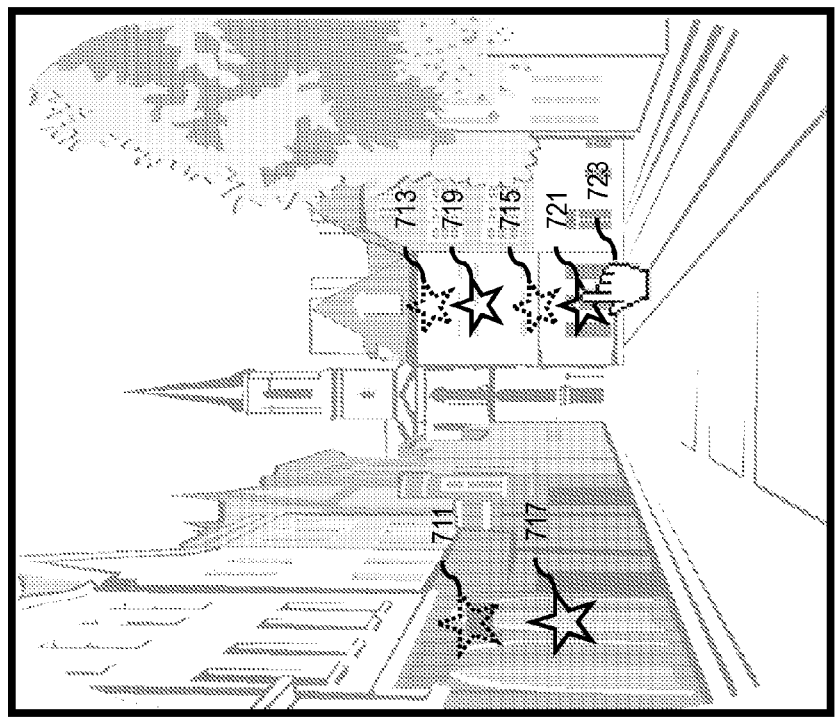
FIGS. 7A-7D are diagrams of user interfaces utilized in the processes of FIG. 4, according to various embodiments.

FIG. 7A shows a user interface with three star-shaped icons (e.g., representations 701, 703, and 705), which represents three different POIs. In this example, the representations 701, 703, and 705 appear, at least with respect to the location information and/or horizontal orientation information, to be accurately superimposed over the location-based display of the town square. The vertical orientation (e.g., height), however, is noticeably inaccurate. For example, the representations 701 and 705 appear to be between the first floor and the second floor, while the representation 703 appears to be between the second floor and the roof of the building.

Figure 7B:
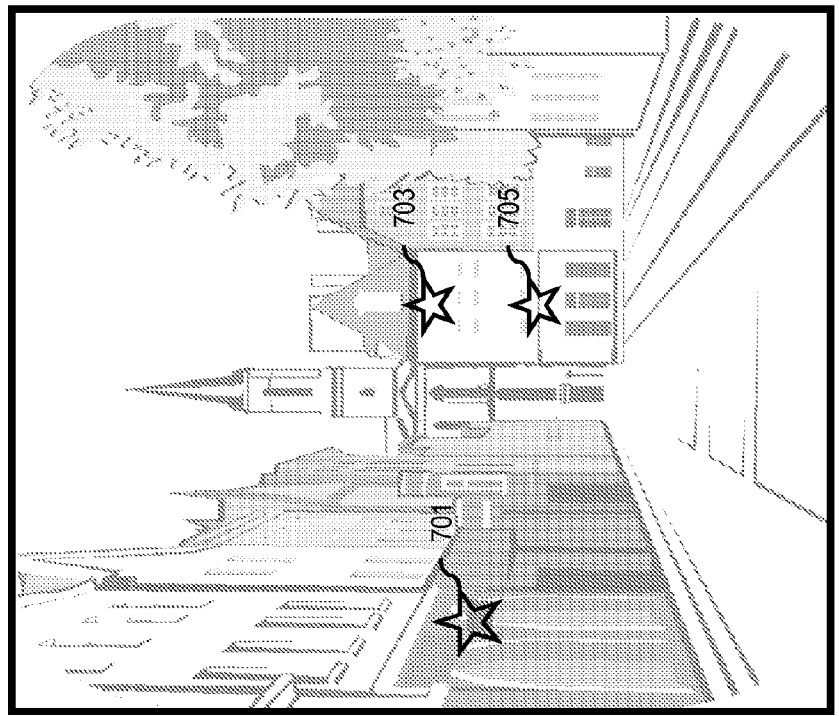

FIG. 7B shows a user interface with six star-shaped icons (e.g., representations 711, 713, 715, 717, 719, and 721) and a hand symbol 723. As shown, the three star-shaped icons with dotted lines (e.g., the representations 711, 713, and 715) depicts where the representations 701, 703, and 705 used to be, while the three star-shaped icons with solid lines (e.g., the representations 717, 719, and 721) demonstrate where they have been moved. The hand symbol 723 illustrates the ability to provide the offset information by dragging the representations to the correct position within the location-based display of the town square. In this example, the user is able to provide the input specifying offset information for all of the representations within the location-based display by moving or dragging just one of the representations (e.g., representation 721 (or originally representation 705)).

Figure 7D:
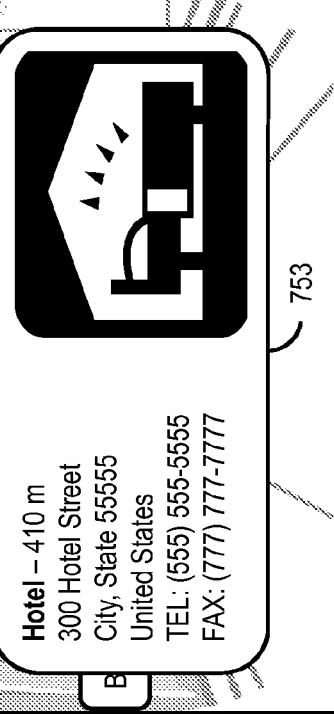
Figure 7C:
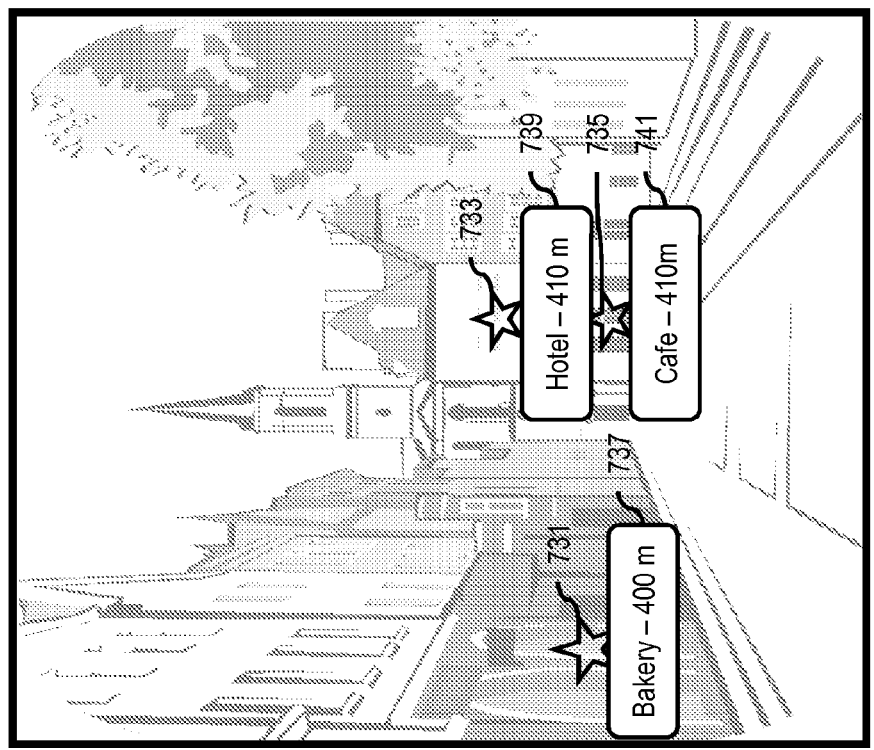

FIG. 7C shows a user interface with three star-shaped icons (e.g., representations 731, 733, and 735) and three labels (representations 737, 739, and 741). As shown, the labels, which include the name of the POI (or the type of POI) along with the distance from the user, are overlaid just below the star-shaped icons. In this example, the previous moving or dragging of just one of the star-shaped icons provided the offset information for representations that were visible and generated (e.g., the representations 731, 733, and 735) and for representations that were not visible and may not have been generated at the time the offset information was provided by the user.

FIG. 7D shows a user interface with a fully visible star-shaped icon (e.g., representation 751) and a summary (e.g., representation 753) that provides information with regard to the particular POI (e.g., the hotel). In this example, the summary may have appeared automatically or through some user action (e.g., clicking or tapping on the particular star-shaped icon).

Figure 8:
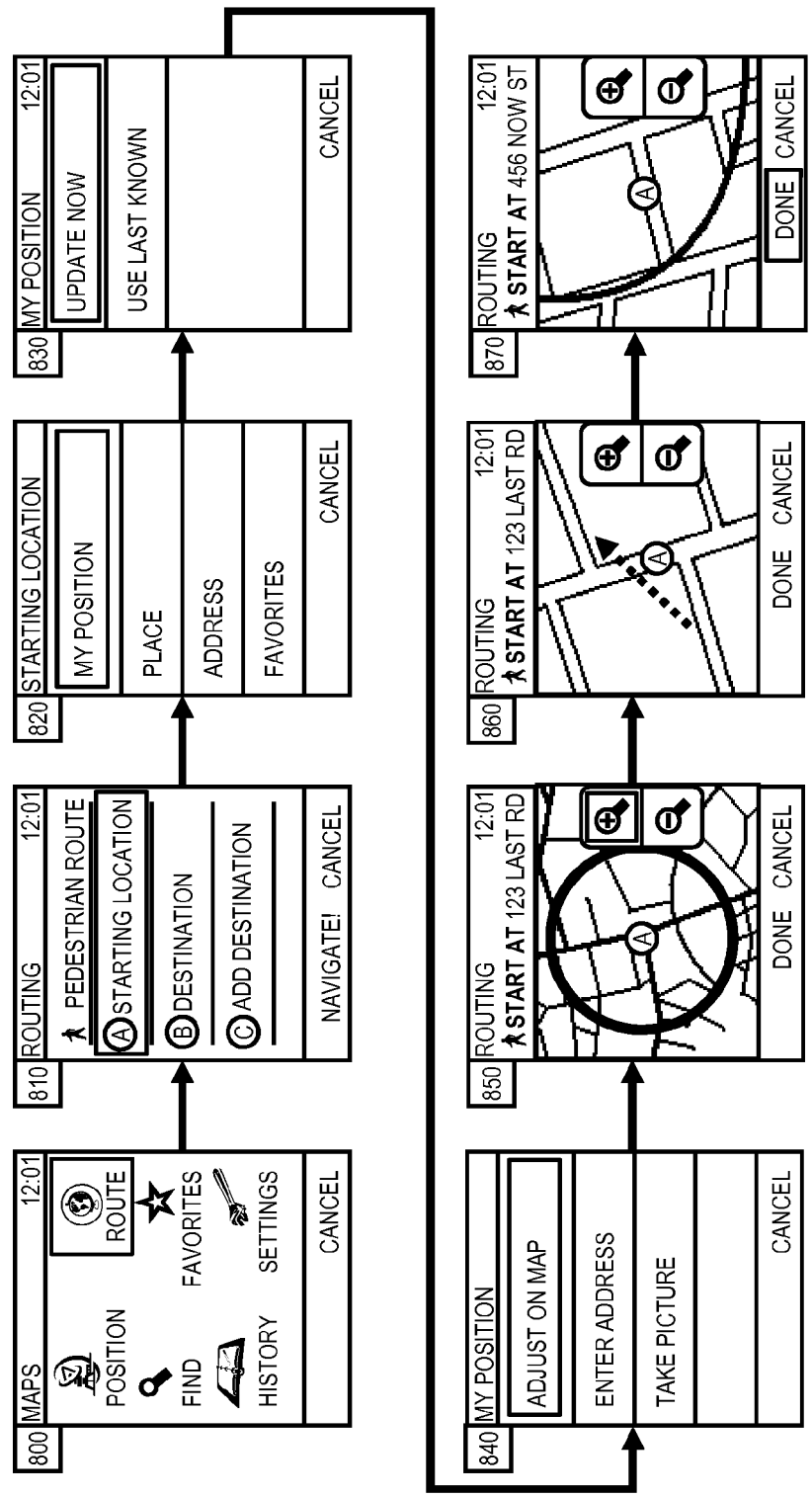
FIG. 8 is a diagram of user interfaces utilized in the processes of FIG. 5, according to one embodiment.

FIG. 8 is a diagram of user interfaces utilized in the processes of FIG. 5, according to one embodiment. Specifically, FIG. 8 provides examples of user interfaces utilizing navigation displays (e.g., user interface 800, 810, 820, 830, 840, 850, 860, and 870). By way of example, the user interface 800 provides the user with several options, including "Position", "Route", "Find", "Favorites", "Settings", and "Cancel." In this case, the user has selected the option "Route," which causes the user interface 810 to appear.

The user interface 810 provides the user with several options, including "Starting Location", "Destination", "Add Destination", "Navigate!", and "Cancel." In this example, the starting location and the destination may be predetermined (e.g., last known starting position or destination). Thus, the user may choose to "Navigate!" immediately. However, the user may also view, modify, or confirm either the starting location or the destination by selecting "Starting Location" or "Destination." In this case, the user has selected "Starting Location", which causes the user interface 820 to appear.

The user interface 820 provides the user with several options, including "My Position", "Place", "Address", Favorites", and "Cancel." In this case, the user has selected "My Position", which allows the user to update the user's position or to use the user's last known position. As illustrated in user interface 830, the user has opted to "Update Now" rather than "Use Last Known."

As previous discussed, the user may provide the starting location (e.g., "My Position") in a number of ways. The user interface 840, as shown, illustrates that the user may "Adjust on Map", "Enter Address", or "Take Picture" to provide the starting location. In this case, the user has chosen to provide the starting location by adjusting the starting location on the map. As such, the user interface 850 displays a map with the user's starting location labeled as an "A". The user's starting location is shown as being 123 Last Road, which may have been the user's last known location. To see a zoomed-in version of the map, the user has clicked on the magnifying glass icon with a "+" sign.

In response, the user interface 860 displays a zoomed-in version of the map with the user's starting location labeled as an "A". As discussed above, the user may adjust the starting location (e.g., moving at least one representation, clicking a position on the map, etc.) in a number of way, such as dragging the starting location labeled as an "A", dragging the map layer, or clicking a position on the map. In this case, the user has chosen to drag the map layer in order to adjust the user's starting location on the map. Consequently, as shown in the user interface 870, the user's starting location has been modified to 456 Now Street. Thereafter, the user selects "Done" to begin further navigation.

Figure 9:
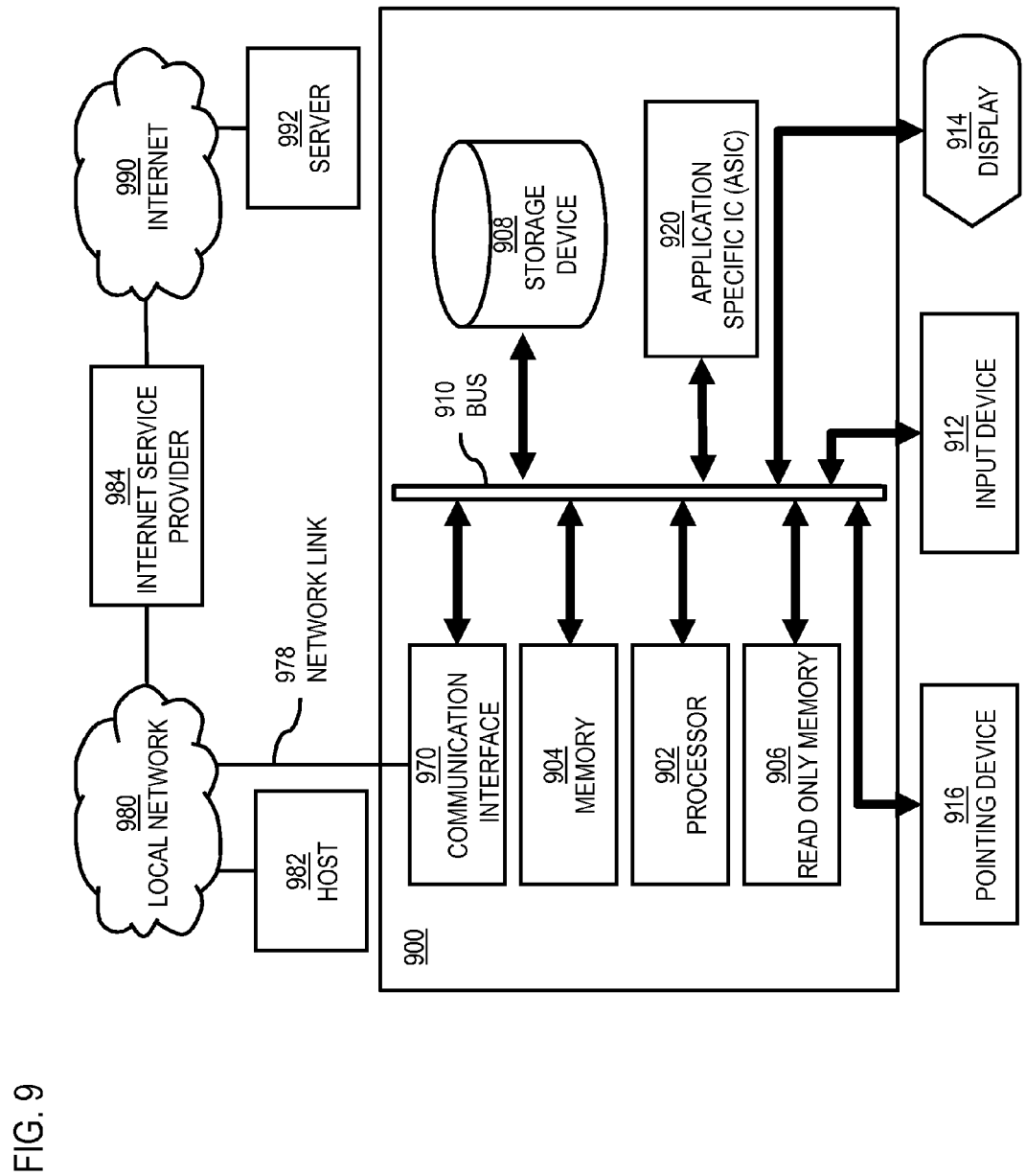
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine location offset information as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining location offset information.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determining location offset information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for determining location offset information. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining location offset information, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for determining location offset information to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine location offset information as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining location offset information.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine location offset information. The memory 1005 also stores the data associated with or generated by the execution of the inventive steps.

Figure 11:
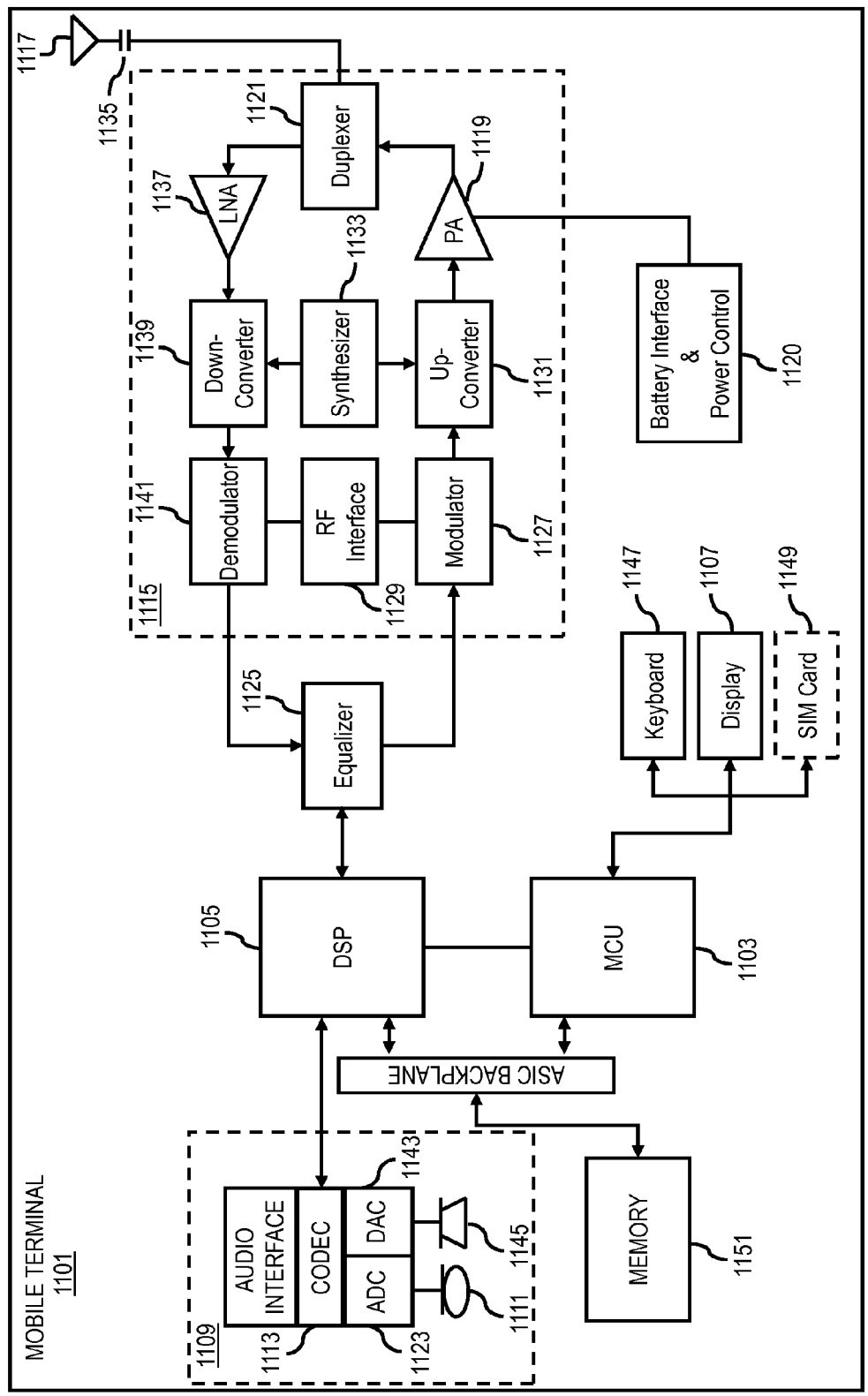
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of determining location offset information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining location offset information. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine location offset information. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for presenting a location-based display, comprising:
    presenting, on a device, a location-based display associated with the location of the device;
    presenting a plurality of representations of location-based features in the location-based display based on the location of the device;
    receiving an input specifying offset information of at least one of the plurality of representations with respect to the location-based display;
    determining accuracy information associated with the location-based display; and
    responsive to the accuracy information not meeting a predetermined accuracy threshold, adapting the presentation of at least one other of the plurality of representations that are one of within a predetermined area and currently viewable in the location-based display based, at least in part, on the offset information.

2. A method of claim 1, wherein the location-based display is further based on orientation information associated with the device.

3. A method of claim 2,
    wherein the step of determining accuracy information determines the accuracy information associated with the location-based display based on location information, the orientation information, or a combination thereof.

4. A method of claim 1, further comprising:
    retrieving other offset information associated with one or more other devices, collected at one or more other time instances, or a combination thereof; and determining to generate aggregated offset information based, at least in part, on the offset information, the other offset information, or a combination thereof.

5. A method of claim 4, further comprising:
    categorizing the offset information, the other offset information, or a combination thereof according to at least a type of device, a type of location sensor, a source of location information, or a combination thereof,
    wherein the aggregated offset information is further based, at least in part, on the categorization.

6. A method of claim 1, wherein the location-based display is at least one of an augmented reality display, a mixed reality display, a virtual reality display, or a combination thereof.

7. A method of claim 1, wherein the representations comprise at least one of graphic information, text information and a combination thereof.

8. A method of claim 1, wherein the location-based features comprise at least one of location, point of interest, road, terrain type, boundary and a combination thereof.

9. An apparatus for presenting a location-based display, comprising:
at least one processor; and
at least one tangible non-transitory computer-readable memory including computer program code configured to be executed by the at least one processor, wherein the computer program code is configured to:
present a location-based display associated with the location of the apparatus;
present a plurality of representations of location-based features in the location-based display based on the location of the apparatus;
receive an input for specifying offset information of at least one of the plurality of representations with respect to the location-based display;
determine accuracy information associated with the location-based display; and
responsive to the accuracy information not meeting a predetermined accuracy threshold, adapt the presentation of at least one other of the plurality of representations that are one of within a predetermined area and currently viewable in the location-based display based, at least in part, on the offset information.

10. An apparatus of claim 9, wherein the presentation of the plurality of representations in the location-based display is further adapted based on orientation information associated with the apparatus.

11. An apparatus of claim 10, wherein the computer program code is further configured to determine the accuracy information associated with the location-based display based on location information, the orientation information, or a combination thereof.

12. An apparatus of claim 9, wherein the computer program code is further configured to:
store the offset information; and
determine to apply the stored offset information to one or more other location-based display if the one or more other location-based display is associated with a location that is substantially similar to or within a predetermined proximity of location associated with the location-based display.

13. An apparatus of claim 9, wherein the computer program code is further configured to:
retrieve other offset information associated with one or more other devices, collected at one or more other time instances, or a combination thereof; and
generate aggregated offset information based, at least in part, on the offset information, the other offset information, or a combination thereof.

14. An apparatus of claim 13, wherein the computer program code is further configured to:
categorize the offset information, the other offset information, or a combination thereof according to at least a type of device, a type of location sensor, a source of location information, or a combination thereof,
wherein the aggregated offset information is further based, at least in part, on the categorization.

15. An apparatus of claim 14, wherein the location-based display is at least one of an augmented reality display, a mixed reality display, a virtual reality display, or a combination thereof.

16. An apparatus of claim 9, wherein the representations comprise at least one of graphic information, text information and a combination thereof.

17. An apparatus of claim 9, wherein the location-based features comprise at least one of location, point of interest, road, terrain type, boundary and a combination thereof.

18. A tangible non-transitory computer-readable medium including computer program code configured to be executed by at least one processor, wherein the computer program code is configured to:
present, on a device, a location-based display associated with the location of the device;
present a plurality of representations of location-based features in the location-based display based on the location of the device;
receive an input specifying offset information of at least one of the plurality of representations with respect to the location-based display;
determine accuracy information associated with the location-based display; and
responsive to the accuracy information not meeting a predetermined accuracy threshold, adapt the presentation of at least one other of the plurality of representations that are one of within a predetermined area and currently viewable in the location-based display based, at least in part, on the offset information.

19. A tangible non-transitory computer-readable medium of claim 18, wherein the representations comprise at least one of graphic information, text information and a combination thereof.

20. A method of claim 18, wherein the location-based features comprise at least one of location, point of interest, road, terrain type, boundary and a combination thereof.

* * * * *